US012437208B2

(12) United States Patent
Li et al.

(10) Patent No.: US 12,437,208 B2
(45) Date of Patent: Oct. 7, 2025

(54) PICTURE SEARCHING METHOD AND APPARATUS, ELECTRONIC DEVICE AND COMPUTER READABLE STORAGE MEDIUM

(71) Applicant: BEIJING BAIDU NETCOM SCIENCE TECHNOLOGY CO., LTD., Beijing (CN)

(72) Inventors: Yong Li, Beijing (CN); Yicheng Zhao, Beijing (CN); Rui Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 934 days.

(21) Appl. No.: 17/578,663

(22) Filed: Jan. 19, 2022

(65) Prior Publication Data
US 2022/0245465 A1 Aug. 4, 2022

(30) Foreign Application Priority Data
Feb. 1, 2021 (CN) .......................... 202110136576.0

(51) Int. Cl.
*G06N 5/01* (2023.01)
*G06F 16/532* (2019.01)
(Continued)

(52) U.S. Cl.
CPC ............. *G06N 5/01* (2023.01); *G06F 16/535* (2019.01); *G06V 10/771* (2022.01);
(Continued)

(58) Field of Classification Search
CPC .......... G06N 5/01; G06N 5/041; G06N 5/048; G06N 20/00; G06F 16/535;
(Continued)

(56) References Cited

U.S. PATENT DOCUMENTS

2009/0037408 A1* 2/2009 Rodgers ................ G06F 16/951
707/999.005
2009/0327274 A1* 12/2009 Kejariwal ............ G06F 16/951
707/999.005
(Continued)

FOREIGN PATENT DOCUMENTS

CN 1687932 A 10/2005
CN 106156127 A 11/2016
(Continued)

OTHER PUBLICATIONS

Gao et al., (NPL "SOML: Sparse Online Metric Learning with Application to Image Retrieval" Published 2014 (Total 7 Pages), (Year: 2014).*
(Continued)

*Primary Examiner* — Quoc A Tran
(74) *Attorney, Agent, or Firm* — Brooks Kushman P.C.

(57) ABSTRACT

The present disclosure discloses a picture searching method and apparatus, an electronic device, and a computer readable storage medium, and relates to the field of artificial intelligence, such as intelligent cloud, computer vision, deep learning, or the like. The method may include: acquiring features of pictures in a picture set to be searched, generating a decision tree according to the acquired features, and configuring corresponding questions for nodes in the decision tree respectively; and if a picture searching request of a user is received, asking the user the configured question, selecting an optimal path from the decision tree in conjunction with an answer of the user, and taking the picture corresponding to a leaf node on the optimal path as a searched picture. With the solution of the present disclosure, the picture required by the user may be conveniently and accurately searched without a keyword.

17 Claims, 4 Drawing Sheets

(51) Int. Cl.
  *G06F 16/535* (2019.01)
  *G06F 16/538* (2019.01)
  *G06F 16/55* (2019.01)
  *G06F 16/583* (2019.01)
  *G06F 18/243* (2023.01)
  *G06N 5/04* (2023.01)
  *G06N 5/048* (2023.01)
  *G06N 20/00* (2019.01)
  *G06V 10/77* (2022.01)
  *G06V 10/771* (2022.01)

(52) U.S. Cl.
  CPC ........ *G06V 10/7715* (2022.01); *G06F 16/532* (2019.01); *G06F 16/538* (2019.01); *G06F 16/55* (2019.01); *G06F 16/583* (2019.01); *G06F 18/24323* (2023.01); *G06N 5/041* (2013.01); *G06N 5/048* (2013.01); *G06N 20/00* (2019.01); *Y02D 10/00* (2018.01)

(58) Field of Classification Search
  CPC .. G06F 18/24323; G06F 16/55; G06F 16/532; G06F 16/538; G06F 16/583; G06V 10/771; G06V 10/7715; Y02D 10/00
  See application file for complete search history.

(56) References Cited

U.S. PATENT DOCUMENTS

| | | |
|---|---|---|
| 2013/0304676 A1 | 11/2013 | Gupta et al. |
| 2019/0073598 A1 | 3/2019 | Giovannini et al. |
| 2019/0250975 A1* | 8/2019 | Bertiger .............. G06F 11/0721 |
| 2020/0233874 A1* | 7/2020 | Chittar .................. G06F 16/243 |
| 2021/0346091 A1* | 11/2021 | Haslam .................. G16H 30/40 |

FOREIGN PATENT DOCUMENTS

| | | |
|---|---|---|
| CN | 107577689 A | 1/2018 |
| CN | 107741976 A | 2/2018 |
| CN | 108764321 A | 11/2018 |
| CN | 108875955 A | 11/2018 |
| CN | 110046179 A | 7/2019 |
| CN | 110532363 A | 12/2019 |
| CN | 111340121 A | 6/2020 |
| CN | 111385188 A | 7/2020 |
| CN | 112101419 A | 12/2020 |
| JP | 2015230514 A | 12/2015 |
| JP | 2017055745 A | 3/2017 |
| JP | 2020060846 A | 4/2020 |
| JP | 2022117941 A | 8/2022 |
| WO | 2019062416 A1 | 4/2019 |

OTHER PUBLICATIONS

Tangirala et al., (NPL "Evaluating the Impact of GINI Index and Information Gain on Classification using Decision Tree Classifier Algorithm" Published 2020 (Total 8 Pages) (Year: 2020).*

Liu, et al., Efficient Active Feedback Scheme of Image Multi-class Classification, Computer Engineering and Design, 2011, vol. 32, No. 4, 1387, 4 pages.

Notice of allowance of Korean application No. 10-2022-0004812 dated Apr. 19, 2025, 3 pages.

* cited by examiner

PICTURE SEARCHING METHOD AND APPARATUS, ELECTRONIC DEVICE AND COMPUTER READABLE STORAGE MEDIUM

CROSS-REFERENCE TO RELATED APPLICATIONS

The present application claims the priority of Chinese Patent Application No. 202110136576.0, filed on Feb. 1, 2021, with the title of "Picture searching method and apparatus, electronic device and computer readable storage media." The disclosure of the above application is incorporated herein by reference in its entirety.

TECHNICAL FIELD

The present disclosure relates to the field of artificial intelligence technologies, and particularly to a picture searching method and apparatus, an electronic device, and a computer readable storage medium in the fields of intelligent cloud, computer vision, deep learning, or the like.

BACKGROUND

Currently, there exists an explosive growth trend in a number of pictures for users. As a basic function of a cloud photo album product, a searching function may provide the user with a picture (such as a photo) retrieval capability, and as the pictures have an increased number, the searching function becomes more and more important.

In a conventional searching method, a searching operation is mainly performed based on a keyword. That is, the user inputs the keyword, and cloud maps the keyword into a class best meeting conditions, and outputs pictures under the class. However, this method is only suitable for a case where the user has a clear memory of the picture to be searched and may clearly express the picture by the keyword. In many cases, the user may only have a vague memory of the picture to be searched. For example, only the picture of a person at a certain location at a certain approximate time range can be remembered. Currently, for such a situation, there is no good solution.

SUMMARY

The present disclosure provides a picture searching method and apparatus, an electronic device, and a computer readable storage medium.

A picture searching method includes acquiring features of pictures in a picture set to be searched, generating a decision tree according to the features, and configuring corresponding questions for nodes in the decision tree respectively; and if a picture searching request of a user is received, asking the user the question, selecting an optimal path from the decision tree in conjunction with an answer of the user, and taking the picture corresponding to a leaf node on the optimal path as a searched picture.

An electronic device includes at least one processor; and a memory communicatively connected with the at least one processor; wherein the memory stores instructions executable by the at least one processor, and the instructions are executed by the at least one processor to enable the at least one processor to perform a picture searching method, wherein the picture searching method includes acquiring features of pictures in a picture set to be searched, generating a decision tree according to the features, and configuring corresponding questions for nodes in the decision tree respectively; and if a picture searching request of a user is received, asking the user the question, selecting an optimal path from the decision tree in conjunction with an answer of the user, and taking the picture corresponding to a leaf node on the optimal path as a searched picture.

There is provided a non-transitory computer readable storage medium with computer instructions stored thereon, wherein the computer instructions are used for causing a computer to perform a picture searching method, wherein the picture searching method includes: acquiring features of pictures in a picture set to be searched, generating a decision tree according to the features, and configuring corresponding questions for nodes in the decision tree respectively; and if a picture searching request of a user is received, asking the user the question, selecting an optimal path from the decision tree in conjunction with an answer of the user, and taking the picture corresponding to a leaf node on the optimal path as a searched picture.

An embodiment in the above-mentioned disclosure has the following advantages or beneficial effects: the picture to be searched by the user may be determined by actively asking the user the question for guidance in conjunction with the answer of the user by adopting a picture fuzzy searching method based on the decision tree based on the decision tree generated according to the acquired picture features. And therefore, the picture required by the user may be conveniently and accurately searched without a keyword.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

In addition, it should be understood that the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Figure 1:
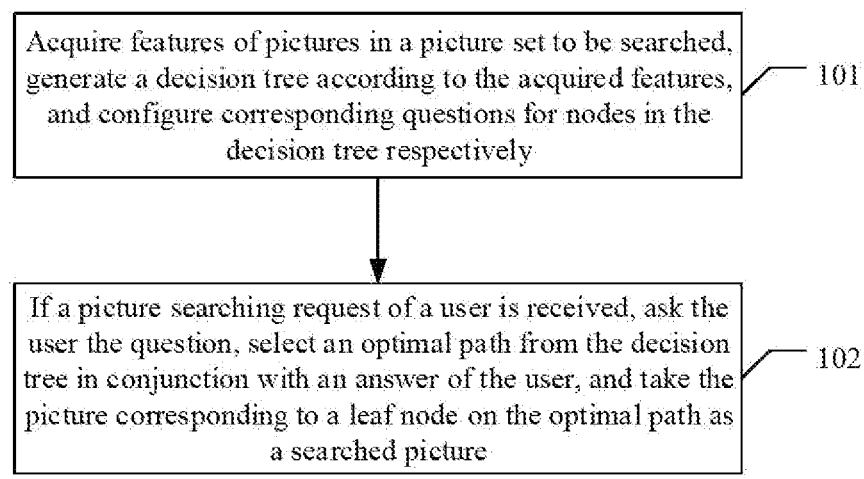
FIG. 1 is a flow chart of a picture searching method according to an embodiment of the present disclosure.

FIG. 1 is a flow chart of a picture searching method according to an embodiment of the present disclosure. As shown in FIG. 1, the picture searching method includes the following implementation steps:

101: acquiring features of pictures in a picture set to be searched, generating a decision tree according to the acquired features, and configuring corresponding questions for nodes in the decision tree respectively.

102: if a picture searching request of a user is received, asking the user the question, selecting an optimal path from the decision tree in conjunction with an answer of the user, and taking the picture corresponding to a leaf node on the optimal path as a searched picture.

It is observed that, in the solution of the embodiment of the above-mentioned method, the picture to be searched by the user may be determined by actively asking the user the question for guidance in conjunction with the answer of the user by adopting a picture fuzzy searching method based on the decision tree based on the decision tree generated according to the acquired picture features. And therefore, the picture required by the user may be conveniently and accurately searched without a keyword.

A decision tree, which may also be referred to as a classification decision tree, or the like, is a prediction model, has a tree structure configured to describe how to classify instances, and is composed of nodes and directed edges. The nodes may have two types, i.e., internal nodes and leaf nodes; the internal node may also be referred to as an intermediate node, or the like, and represents a feature or attribute, and the leaf node represents a class.

Figure 2:
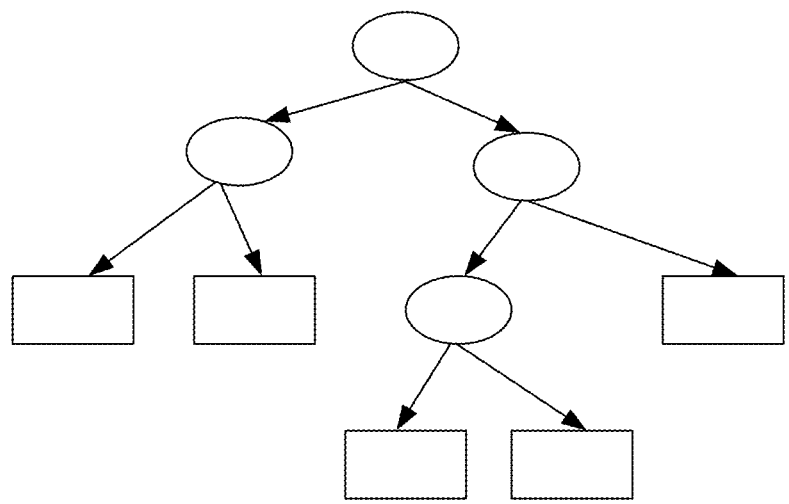
FIG. 2 is a schematic structural diagram of a decision tree according to the present disclosure.

FIG. 2 is a schematic structural diagram of a decision tree according to the present disclosure. As shown in FIG. 2, the rectangular node represents the leaf node, and the oval node represents the internal node.

In the picture fuzzy searching method based on the decision tree in the present disclosure, the features of the pictures in the picture set to be searched may be acquired first, the decision tree may be then generated according to the acquired features, and the corresponding questions may be configured for the nodes in the decision tree respectively.

The picture set to be searched may refer to a picture set of a certain user. There is no limitation in the present disclosure as to how to acquire the features of the pictures in the picture set to be searched. For example, a picture feature model may be used to extract the features of the pictures.

There is also no limitation in specific features included in the acquired features of the pictures. For example, the features may include a shooting time, a shooting location, an animal, a person, or the like.

In addition, the question configured for the node in the decision tree is generally a question of expressing semantics which is easily understood by the user.

If the picture searching request of the user is received, the user may be asked the configured question, the optimal path may be selected from the decision tree in conjunction with the answer of the user, and the picture corresponding to the leaf node on the optimal path may be taken as the searched picture, i.e., a target picture.

Specifically, if the optimal path is selected from the decision tree, a root node in the decision tree may be used as a current node, and the following first processing operation is performed: asking the user the question corresponding to the current node; acquiring an answer of the user, and determining a child node matched with the answer from child nodes of the current node; if the matched child node is determined to be a leaf node, taking a path from the root node to the leaf node as the required optimal path, otherwise, taking the matched child node as the current node, and repeatedly executing the first processing operation.

Figure 3:
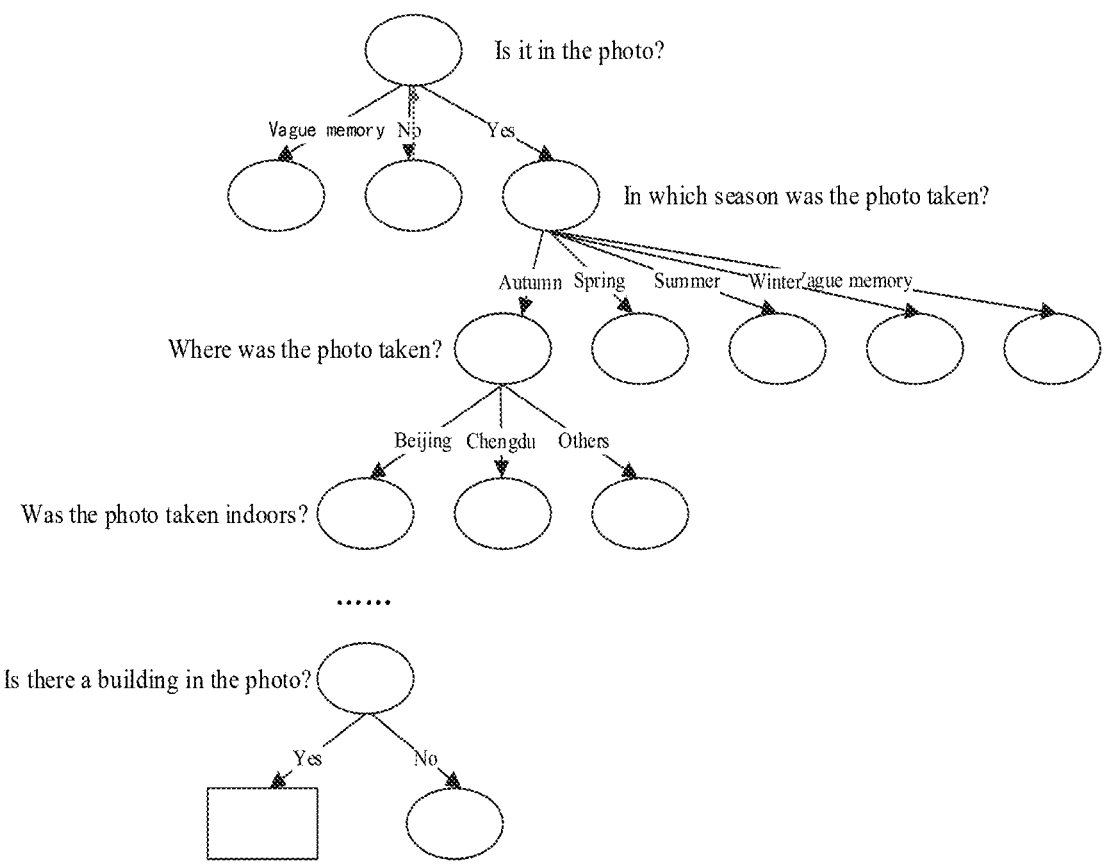
FIG. 3 is a schematic diagram of an implementation process of a picture fuzzy searching method based on a decision tree according to the present disclosure.

Based on the above introduction, FIG. 3 is a schematic diagram of an implementation process of the picture fuzzy searching method based on a decision tree according to the present disclosure.

As shown in FIG. 3, after generation of the decision tree and configuration of the questions corresponding to the nodes in the decision tree, the user may first be asked the question corresponding to the root node, "Is it in the photo?", assuming that the answer of the user is "yes", a node matched with "yes" as shown in FIG. 3 may be determined, this node is a child node of the root node, and for convenience of description, this node is referred to as node 1.

The user may then be asked the question corresponding to node 1, "In which season was the photo taken?", assuming that the answer of the user is "autumn", a node matched with "autumn" as shown in FIG. 3 may be determined, this node is a child node of node 1, and for convenience of description, this node is referred to as node 2.

The user may then be asked the question corresponding to node 2, "Where was the photo taken?", assuming that the answer of the user is "Beijing", a node matched with "Beijing" as shown in FIG. 3 may be determined, this node is a child node of node 2, and for convenience of description, this node is referred to as node 3.

The user may then be asked the question corresponding to node 3, "Was the photo taken indoors?", . . . , the user may then be asked the question corresponding to node p (p is greater than 3), "Is there a building in the photo?", assuming that the answer of the user is "yes", a node matched with "yes" as shown in FIG. 3 may be determined, assuming that the node is referred to as node p+1, since node p+1 is a leaf node, a path from the root node to node p+1 may be taken as the required optimal path.

Further, the picture corresponding to the leaf node on the optimal path may be used as the searched picture, such as "the picture of it at Beijing Tian An Men on National Day."

A number of the searched pictures may be one or more, and if the number is more than one, and if the number is greater than a predetermined threshold, part of the pictures may be screened out, the screened part of the pictures are returned to the user as a final result, and how to screen the pictures is not limited.

Taking a cloud photo album as an example, as time goes on, a memory of the user for pictures in the cloud photo album becomes vaguer and vaguer, and in this case, the pictures are unable to be searched using the keyword, but the picture fuzzy searching method based on a decision tree according to the present disclosure may assist the user in conveniently and accurately searching the required picture.

Moreover, the picture fuzzy searching method based on a decision tree according to the present disclosure has a high searching speed, that is, may quickly converge to a result set, thereby improving a searching efficiency.

In addition, in the picture fuzzy searching method based on a decision tree according to the present disclosure, a decision may be made more comprehensively using the picture features, and each decision may more accurately assist the user in excluding irrelevant pictures, such that a situation that the result is unable to be searched may be avoided, thereby improving a searching success rate, or the like.

During classification by the decision tree, each feature of an instance is tested, the instance is distributed to the child node according to the result, and in order to utilize the decision tree for classification as quickly as possible, a structure, a sequence, or the like, of the internal node are quite important.

Specifically, in the present disclosure, how to generate the decision tree has a direct influence on the searching speed and so on. In practical applications, the decision tree may be generated according to the acquired features of the pictures on the basis of a predetermined feature selection criterion.

The feature selection criterion is made to divide a data set using features, the data set after division has higher purity than the data set before division, and a lower uncertainty than the data set before division, and the generation process of the decision tree is a process of continuously dividing the data set into the data set with higher purity and a lower uncertainty using the features meeting the feature selection criterion.

Currently, the common feature selection criteria include: an information gain, an information gain ratio, and a Gini coefficient, which are described below respectively.

1) Information Gain

In the information theory, entropy is used for representing an uncertainty of random variables, and an information gain is established on the basis of the entropy information theory.

The information gain g(D, A) of any feature A with respect to the data set D may be defined as a difference between an empirical entropy H(D) of the data set D and an empirical conditional entropy H(D|A) of the data set D given the feature A, and expressed as:

$$g(D,A)=H(D)-H(D|A) \quad (1)$$

The above expression may be understood to be subtraction of the entropy of the data set D after the feature A is learned from the initial entropy of the data set D, and usually, the entropy is decreased for an uncertain object when more relevant information is known, such that H(D) is usually greater than H(D|A), and the difference between H(D) and H(D|A) quantifies a degree of the information gain.

The process of generating the decision tree may be converted into a process of recursively constructing the decision tree using the information gain as the feature selection criterion, which is an implementation process corresponding to an iterative Dichotomiser 3 (ID3) algorithm.

The implementation process of the ID3 algorithm may specifically include the root node is taken as the current node, the original data set is taken as a data set corresponding to the current node, an original feature set is taken as a feature set corresponding to the current node, and the following fourth processing operation is executed:

The information gain of each feature in the feature set corresponding to the current node relative to the data set corresponding to the current node is acquired; assuming that the feature set corresponding to the current node includes 3 features, which are feature 1, feature 2 and feature 3 respectively, 3 information gains may be obtained;

The feature with the maximum information gain is selected and assumed to be feature 2, further, nodes corresponding to different feature values corresponding to feature 2 are established respectively, and the established nodes are taken as child nodes of the current node; for example, if feature 2 is the shooting location and the corresponding feature values include Beijing, Shanghai, Guangzhou, or the like, the child node corresponding to each feature value may be established;

Data matched with each child node of the current node is selected from the data set corresponding to the current node to form a data set corresponding to the child node, the matched data is data with the feature value of the selected feature being the feature value corresponding to the child node; for example, if the feature value corresponding to a certain child node is Beijing, the data with the shooting location being Beijing is selected from the data set corresponding to the current node to form the data set corresponding to the child node;

The selected feature, such as feature 2, is deleted from the feature set corresponding to the current node to obtain an updated feature set; and If each child node of the current node is determined to be a leaf node, the processing operation for the child node is ended, otherwise, the child node is taken as the current node, the updated feature set is taken as the feature set corresponding to the current node, and the fourth processing operation is repeated until the last nodes on all paths starting from the root node are leaf nodes.

In practical applications, if the data set corresponding to a certain child node only includes one class, i.e., a single class, and is unable to be divided continuously, the child node may be determined to be a leaf node.

2) Information Gain Ratio

The ID3 algorithm has a large disadvantage that it is prone to overfitting, and the information gain is biased towards the feature with a large number of feature values. The reason is that when the feature values corresponding to a certain feature have a large number, a subset with higher purity is obtained more easily by division according to the feature, such that the entropy after division is lower, and since the entropy before division is constant, the obtained information gain is greater.

In view of the above problem, a concept of the information gain ratio is proposed, and may attenuate an influence of the number of the feature values on the information gain.

The information gain ratio gR(D, A) of any feature A with respect to the data set D may be defined as a ratio of the information gain g(D, A) to the entropy $H_A(D)$ of the data set D with respect to the feature A, i.e., $$gR(D, A) = \frac{g(D, A)}{H_A(D)} \quad (2)$$

where $$H_A(D) = -\sum_{i=1}^{N} \frac{|D_i|}{|D|} \log_2 \frac{|D_i|}{|D|} \quad (3)$$

N expresses the number of the feature values corresponding to the feature A, $D_i$ represents a data set formed by data with values of the feature A being the feature value i in the data set D, |D| represents the quantity of the data included in the data set D, and $|D_i|$ represents the quantity of the data included in the data set $D_i$.

The above equation shows that the more the feature values corresponding to one feature, the higher the uncertainty, and the greater the $H_A(D)$.

A relationship of the information gain ratio to the information gain may be expressed as:

information gain ratio=information gain×penalty parameter    (4)

wherein the penalty parameter is $$\frac{1}{H_A(D)},$$

such that me influence of me number of the feature value on the information gain is counteracted to a certain extent.

The information gain ratio corresponds to the C4.5 algorithm, and the C4.5 algorithm is implemented similarly to the ID3 algorithm except that the information gain in the ID3 algorithm is replaced with the information gain ratio.

3) Gini Coefficient

In the ID3 algorithm, the information gain is used to select the features, and the features with large information gains are selected preferentially, and in the C4.5 algorithm, the information gain ratio is used to select the features, thus reducing the problem of a large information gain caused by a large number of feature values. In the classification and regression tree (CART) algorithm, the Gini coefficient is used to select the features, and represents impurity, and the smaller the Gini coefficient, the lower the impurity, the better the features, which is exactly opposite to the information gain (ratio).

The purity of the data set D may be measured using the Gini coefficient; that is, the Gini coefficient of the data set D may be defined as:

$$\text{Gini}(D)=\Sigma_{i=1}^{n} p(x_i)*(1-p(x_i))=1-p(x_i)^2 \quad (5)$$

wherein p(xi) represents a probability that data x belongs to class i, and n represents a number of classes; that is, the data set D includes n classes, Gini(D) reflects a probability that a piece of randomly selected data in the data set D is classified wrongly, i.e., a probability that a randomly selected sample in a sample set is classified wrongly, and the smaller the Gini coefficient, the smaller the probability that the selected sample in the sample set is classified wrongly, that is, the higher the purity of the sample set, and conversely, the lower the purity.

The data set D may be divided into two data sets D1 and D2 (or referred to as data subsets) according to whether the feature A takes a certain feature value a.

Correspondingly, the Gini coefficient of the feature value a corresponding to the feature A with respect to the data set D may be defined as:

$$\text{GiniIndex}(D \mid A = a) = \frac{|D_1|}{|D|}\text{Gini}(D_1) + \frac{|D_2|}{|D|}\text{Gini}(D_2) \quad (6)$$

wherein |D| represents the quantity of the data included in the data set D, i.e., the number of samples, $|D_i|$ represents the quantity of data included in the data set D1, and $|D_2|$ represents the quantity of data included in the data set D2.

Compared with the ID3 algorithm and the C4.5 algorithm, the CART algorithm has an advantage that it may handle both discrete and continuous feature values. For example, the shooting time of the picture is a continuous feature value, and split calculation may be performed on the Gini coefficient according to seasons.

The implementation process of the CART algorithm may specifically include that the root node is taken as the current node, the original data set is taken as a data set corresponding to the current node, an original feature set is taken as a feature set corresponding to the current node, and the following fifth processing operation is executed:

The Gini coefficient of each feature value corresponding to each feature in the feature set corresponding to the current node with respect to the data set corresponding to the current node is acquired;

The Gini coefficient with a minimum value is selected from the obtained Gini coefficients, and the feature (assumed to be feature A) corresponding to the selected Gini coefficient and the feature value (assumed to be feature value a) of the corresponding feature are taken as an optimal feature and an optimal segmentation point;

The data set corresponding to the current node is divided into the two data sets D1 and D2 according to the optimal feature and the optimal segmentation point, two child nodes of the current node are generated, one child node corresponds to the data set D1, the other child node corresponds to the data set D2, a value of the feature A of the data in the data set D1 is the feature value a, and a value of the feature A of the data in the data set D2 is not the feature value a; and If a predetermined condition is determined to be met, the processing operation for each child node of the current node may be ended; for example, if the quantity of the data included in the data set corresponding to the child node is less than a predetermined threshold, for example, 2, or if the Gini coefficient of the data set corresponding to the child node is less than the predetermined threshold, or the like, the predetermined condition may be considered to be met, and if the predetermined condition is determined not to be met, the child node may be regarded as the current node, and the fifth processing operation, or the like, may be repeated As described above, in the present disclosure, the decision tree may be generated according to the acquired features of the pictures on the basis of the predetermined feature selection criteria.

The predetermined feature selection criteria may include one of: the information gain, the information gain ratio, and the Gini coefficient. Or, the predetermined feature selection criteria may include the information gain and the information gain ratio. Or, the predetermined feature selection criteria may include the information gain, the information gain ratio, and the Gini coefficient.

If the predetermined feature selection criterion is the information gain, the decision tree may be generated according to the ID3 algorithm. If the predetermined feature selection criterion is the information gain ratio, the decision tree may be generated according to the C4.5 algorithm. If the predetermined feature selection criterion is the Gini coefficient, the decision tree may be generated according to the CART algorithm. If the predetermined feature selection criteria are the information gain and the information gain ratio, the decision tree may be generated according to an improved first decision tree generation algorithm. If the predetermined feature selection criteria are the information gain, the information gain ratio and the Gini coefficient, the decision tree may be generated according to an improved second decision tree generation algorithm. The specific algorithm to generate the decision tree may be determined according to actual needs, which is quite flexible and convenient.

A specific implementation process of the improved first decision tree generation algorithm may include:

Taking the root node as the current node, taking the original data set as a data set corresponding to the current node, taking an original feature set as a feature set corresponding to the current node, the original data set being a picture set to be searched, the original feature set being a feature set formed by the obtained features of the pictures, and executing the following second processing operation:

Selecting an optimal feature from the feature set corresponding to the current node in conjunction with the information gain and the information gain ratio; establishing corresponding nodes for different feature values corresponding to the optimal features respectively, and taking the established nodes as child nodes of the current node;

Selecting data matched with each child node of the current node from the data set corresponding to the current node to form a data set corresponding to the child node, the matched data being data with the feature value of the optimal feature as the feature value corresponding to the child node;

Deleting the optimal feature from the feature set corresponding to the current node to obtain an updated feature set; and If each child node of the current node is determined to be a leaf node, ending the processing operation for the child node, otherwise, taking the child node as the current node, taking the updated feature set as the feature set corresponding to the current node, and repeating the second processing operation until the last nodes on all paths starting from the root node are leaf nodes.

The method for selecting an optimal feature from the feature set corresponding to the current node in conjunction with the information gain and the information gain ratio may include: acquiring the information gain of each feature in the feature set corresponding to the current node with respect to the data set corresponding to the current node, calculating a mean value of the acquired information gains, selecting the feature with the corresponding information gain greater than the mean value from the features in the feature set corresponding to the current node, acquiring the information gain ratio of each selected feature with respect to the data set corresponding to the current node, and taking the feature with the largest information gain ratio as the optimal feature.

The C4.5 algorithm has a disadvantage that the information gain ratio is biased towards the feature with a small number of feature values, and the reason is that when the feature values have a small number, $H_A(D)$ has a small value, and correspondingly, the reciprocal thereof is large, and therefore, the information gain ratio is also large, and this problem may be solved to a certain extent by the improved first decision tree generation algorithm, in which the feature with the maximum information gain or information gain ratio is not directly selected, but the feature with the value greater than the mean value is first selected using the ID3 algorithm, and then, the feature with the maximum information gain ratio is selected, thereby taking the advantages of the ID3 algorithm and the C4.5 algorithm into account.

A specific implementation process of the improved second decision tree generation algorithm may include:

Taking the root node as the current node, taking the original data set as a data set corresponding to the current node, taking an original feature set as a feature set corresponding to the current node, the original data set being a picture set to be searched, the original feature set being a feature set formed by the obtained features of the pictures, and executing the following third processing operation:

Selecting an optimal feature from the feature set corresponding to the current node in conjunction with the information gain and the information gain ratio; selecting M feature values from the feature values corresponding to the optimal feature using the Gini coefficient, M being a positive integer and less than the number of the feature values corresponding to the optimal feature, and taking the unselected feature values as other feature values; taking the other feature values as a whole, establishing nodes corresponding to the M feature values and the other feature values respectively, and taking the established M+1 nodes as child nodes of the current node;

Selecting data matched with each child node of the current node from the data set corresponding to the current node to form a data set corresponding to the child node, the matched data being data with the feature value of the optimal feature as the feature value corresponding to the child node;

Deleting the optimal feature from the feature set corresponding to the current node to obtain an updated feature set; and If each child node of the current node is determined to be a leaf node, ending the processing operation for the child node, otherwise, taking the child node as the current node, taking the updated feature set as the feature set corresponding to the current node, and repeating the third processing operation until the last nodes on all paths starting from the root node are leaf nodes.

The method for selecting an optimal feature from the feature set corresponding to the current node in conjunction with the information gain and the information gain ratio may include: acquiring the information gain of each feature in the feature set corresponding to the current node with respect to the data set corresponding to the current node, calculating a mean value of the acquired information gains, selecting the feature with the corresponding information gain greater than the mean value from the features in the feature set corresponding to the current node, acquiring the information gain ratio of each selected feature with respect to the data set corresponding to the current node, and taking the feature with the largest information gain ratio as the optimal feature.

The method of selecting M feature values from the feature values corresponding to the optimal feature using the Gini coefficient may include: acquiring the Gini coefficient of each feature value corresponding to the optimal feature with respect to the data set corresponding to the current node, sequencing the acquired Gini coefficients in an ascending order, selecting the first M Gini coefficients after the sequencing operation, and taking the feature values corresponding to the selected M Gini coefficients as the M feature values selected from the feature values corresponding to the optimal feature. The specific value of M may be determined according to actual requirements.

Figure 4:
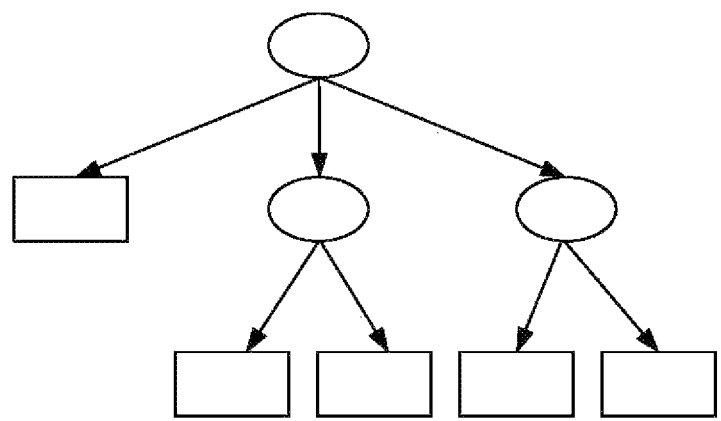
FIG. 4 is a schematic diagram of a decision tree generated using an improved second decision tree generation algorithm according to the present disclosure.

FIG. 4 is a schematic diagram of a decision tree generated using an improved second decision tree generation algorithm according to the present disclosure. It should be noted that the structure of the decision tree is simplified in FIG. 4 for convenience of description, and the actual structure is usually more complicated than that shown in FIG. 4.

As shown in FIG. 4, starting from the root node, the root node is taken as the current node, the picture set to be searched is taken as the data set corresponding to the current node, and the feature set formed by the acquired features of the picture is taken as the feature set corresponding to the current node; first, the information gain of each feature in the feature set corresponding to the current node with respect to the data set corresponding to the current node may be acquired, the mean value of the acquired information gains is calculated, the feature with the corresponding information gain greater than the mean value is selected from the features in the feature set corresponding to the current node, the information gain ratio of each selected feature with respect to the data set corresponding to the current node is acquired, and the feature with the largest information gain ratio is taken as the optimal feature.

For example, the feature set corresponding to the current node includes 3 features, i.e., feature 1, feature 2, and feature 3; correspondingly, 3 information gains may be obtained, a mean value of the 3 information gains may be calculated, the feature having the corresponding information gain greater than the mean value is selected from the 3 features, and it is assumed that feature 1 and feature 2 are selected; further, the information gain ratios corresponding to feature 1 and feature 2 may be obtained respectively, and the feature having the maximum information gain ratio, such as feature 1, is taken as the optimal feature.

Then, the Gini coefficient of each feature value corresponding to the optimal feature with respect to the data set corresponding to the current node may be acquired, the acquired Gini coefficients may be sequenced in an ascending order, the first M Gini coefficients after the sequencing operation are selected, the feature values corresponding to the selected M Gini coefficients are taken as the M feature values selected from the feature values corresponding to the optimal feature, and the unselected feature values may be taken as other feature values. Further, the other feature values may be taken as a whole to establish nodes corresponding to the M feature values and the other feature values respectively, the established M+1 nodes are taken as child nodes of the current node, data matched with each child node of the current node is selected from the data set corresponding to the current node to form a data set corresponding to the child node, and the matched data is data with the feature value of the optimal feature as the feature value corresponding to the child node.

For example, the optimal feature is feature 1, feature 1 corresponds to 4 feature values, i.e., feature value 1, feature value 2, feature value 3, and feature value 4, the Gini coefficients corresponding to feature value 1, feature value 2, feature value 3, and feature value 4 may be obtained, the obtained 4 Gini coefficients may be sorted in an ascending order, and the first 2 Gini coefficients after the sorting operation are selected; it is assumed that the feature values corresponding to the selected 2 Gini coefficients are feature value 1 and feature value 2 respectively, feature value 3 and feature value 4 may be used as other feature values, corresponding nodes are established for feature value 1, feature value 2, and the other feature values respectively, and the established 3 nodes are used as child nodes corresponding to the current node; in addition, the data matched with each child node may be selected from the data set corresponding to the current node, so as to form the data set corresponding to the child node; for example, for the child node corresponding to feature value 1, the data with the value of feature 1 as feature value 1 may be selected from the data set corresponding to the current node, so as to form the data set corresponding to the child node.

Then, the optimal feature may be deleted from the feature set corresponding to the current node to obtain an updated feature set. For example, feature 1 may be deleted from the feature set composed of feature 1, feature 2, and feature 3, resulting in an updated feature set composed of feature 2 and feature 3.

If each child node of the current node is determined to be a leaf node, the processing operation for the child node may be ended, otherwise, the child node may be taken as the current node, the updated feature set may be taken as the feature set corresponding to the current node, and the above-mentioned processing operation may be repeated until the last nodes on all paths starting from the root node are leaf nodes.

For example, assuming that there exist 3 child nodes which are the child node corresponding to feature value 1, the child node corresponding to feature value 2, and the child node corresponding to the other feature values respectively, the child node corresponding to feature value 1 is a leaf node, such as the rectangular node shown in FIG. 4, and then, the processing operation for the child node may be ended; the child node corresponding to feature value 2 and the child node corresponding to the other feature values may be used as current nodes respectively, and the updated feature set is used as the feature set corresponding to the current node, and the above processing operation is repeated; after the processing operation, if 2 child nodes are obtained and are leaf nodes, establishment of the decision tree is finished.

It is observed that, in the above algorithm, the information gain is combined with the information gain ratio, the ID3 algorithm is firstly used to take the feature with the value above the mean value, and then, the feature with the maximum information gain ratio is selected, thereby taking the advantages of the ID3 algorithm and the C4.5 algorithm into account; in addition, for the determined optimal feature, several lower feature values may be screened out using the Gini coefficient, the remaining feature values are classified into the other feature values, thereby reducing problems of too many question options caused by too many feature values, or the like.

The above is a description of an embodiment of the method, and an embodiment of an apparatus according to the present disclosure will be further described below.

Figure 5:
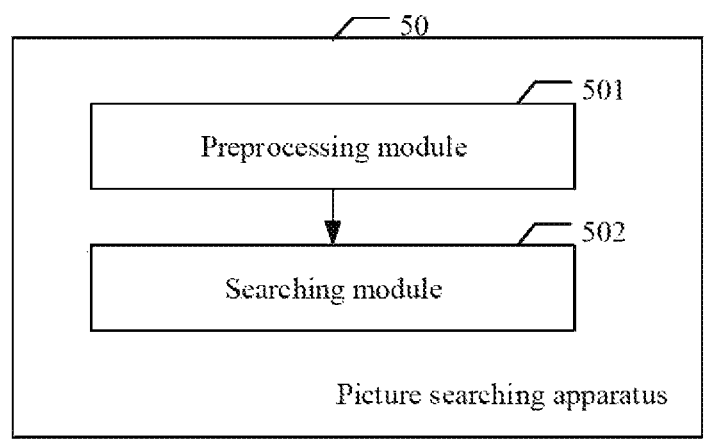
FIG. 5 is a schematic structural diagram of a picture searching apparatus 50 according to an embodiment of the present disclosure.

FIG. 5 is a schematic structural diagram of a picture searching apparatus 50 according to an embodiment of the present disclosure. As shown in FIG. 5, the picture searching apparatus includes: a preprocessing module 501 configured to acquire features of pictures in a picture set to be searched, generate a decision tree according to the acquired features, and configure corresponding questions for nodes in the decision tree respectively; and a searching module 502 configured to, if a picture searching request of a user is received, ask the user the configured question, select an optimal path from the decision tree in conjunction with an answer of the user, and take the picture corresponding to a leaf node on the optimal path as a searched picture.

Specifically, the searching module 502 may use a root node in the decision tree as a current node, and perform the following first processing operation: asking the user the question corresponding to the current node; acquiring an answer of the user, and determining a child node matched with the answer from child nodes of the current node; if the matched child node is determined to be a leaf node, taking a path from the root node to the leaf node as the optimal path, otherwise, taking the matched child node as the current node, and repeatedly executing the first processing operation.

In addition, the preprocessing module 501 may generate the decision tree according to the acquired features on the basis of a predetermined feature selection criterion. The predetermined feature selection criterion includes an information gain; or the predetermined feature selection criterion includes an information gain ratio; or the predetermined feature selection criterion includes a Gini coefficient; or, the predetermined feature selection criteria include an information gain and an information gain ratio; or, the predetermined feature selection criteria include an information gain, an information gain ratio, and a Gini coefficient.

If the predetermined feature selection criteria include the information gain and the information gain ratio, the preprocessing module 501 may take the root node as the current node, take a picture set to be searched as a data set corresponding to the current node, take a feature set formed by the obtained features of the pictures as a feature set corresponding to the current node, and execute the following second processing operation: selecting an optimal feature from the feature set corresponding to the current node in conjunction with the information gain and the information gain ratio; establishing corresponding nodes for different feature values corresponding to the optimal features respectively, and taking the established nodes as child nodes of the current node; selecting data matched with each child node of the current node from the data set corresponding to the current node to form a data set corresponding to the child node, the matched data being data with the feature value of the optimal feature as the feature value corresponding to the child node; deleting the optimal feature from the feature set corresponding to the current node to obtain an updated feature set; and if each child node of the current node is determined to be a leaf node, ending the processing operation for the child node, otherwise, taking the child node as the current node, taking the updated feature set as the feature set corresponding to the current node, and repeating the second processing operation until the last nodes on all paths starting from the root node are leaf nodes.

If the predetermined feature selection criteria include the information gain, the information gain ratio and the Gini coefficient, the preprocessing module 501 may take the root node as the current node, take the picture set to be searched as the data set corresponding to the current node, take the feature set formed by the obtained features of the pictures as the feature set corresponding to the current node, and execute the following third processing operation: selecting an optimal feature from the feature set corresponding to the current node in conjunction with the information gain and the information gain ratio; selecting M feature values from the feature values corresponding to the optimal feature using the Gini coefficient, M being a positive integer and less than the number of the feature values corresponding to the optimal feature, and taking the unselected feature values as other feature values; taking the other feature values as a whole, establishing nodes corresponding to the M feature values and the other feature values respectively, and taking the established M+1 nodes as child nodes of the current node; selecting data matched with each child node of the current node from the data set corresponding to the current node to form a data set corresponding to the child node, the matched data being data with the feature value of the optimal feature as the feature value corresponding to the child node; deleting the optimal feature from the feature set corresponding to the current node to obtain an updated feature set; and if each child node of the current node is determined to be a leaf node, ending the processing operation for the child node, otherwise, taking the child node as the current node, taking the updated feature set as the feature set corresponding to the current node, and repeating the third processing operation until the last nodes on all paths starting from the root node are leaf nodes.

When selecting an optimal feature from the feature set corresponding to the current node in conjunction with the information gain and the information gain ratio, the preprocessing module 501 may acquire the information gain of each feature in the feature set corresponding to the current node with respect to the data set corresponding to the current node, calculate a mean value of the acquired information gains, select the feature with the corresponding information gain greater than the mean value from the features in the feature set corresponding to the current node, acquire the information gain ratio of each selected feature with respect to the data set corresponding to the current node, and take the feature with the largest information gain ratio as the optimal feature.

When selecting M feature values from the feature values corresponding to the optimal feature using the Gini coefficient, the preprocessing module 501 may acquire the Gini coefficient of each feature value corresponding to the optimal feature with respect to the data set corresponding to the current node, sequence the acquired Gini coefficients in an ascending order, select the first M Gini coefficients after the sequencing operation, and take the feature values corresponding to the selected M Gini coefficients as the M feature values selected from the feature values corresponding to the optimal feature.

For the specific work flow of the embodiment of the apparatus shown in FIG. 5, reference is made to the related description in the foregoing embodiment of the method, and details are not repeated.

In conclusion, with the solution of the embodiment of the above-mentioned apparatus, by adopting a picture fuzzy searching method based on the decision tree, based on the decision tree generated according to the acquired picture features, the picture to be searched by the user may be determined by actively asking the user the question for guidance in conjunction with the answer of the user, and therefore, the picture required by the user may be conveniently and accurately searched without a keyword; in addition, the improved decision tree generation algorithm is provided, thereby improving the searching efficiency, or the like.

The solution of the present disclosure may be applied to the field of artificial intelligence, and particularly relates to the fields of intelligent cloud, computer vision, deep learning, or the like.

Artificial intelligence is a subject of researching how to cause a computer to simulate certain thought processes and intelligent behaviors (for example, learning, inferring, thinking, planning, or the like) of a human, and includes both hardware-level technologies and software-level technologies. Generally, the hardware technologies of the artificial intelligence include technologies, such as a sensor, a dedicated artificial intelligence chip, cloud computing, distributed storage, big data processing, or the like; the software technologies of the artificial intelligence mainly include a computer vision technology, a voice recognition technology, a natural language processing technology, a machine learning/deep learning technology, a big data processing technology, a knowledge graph technology, or the like.

According to the embodiment of the present disclosure, there are also provided an electronic device, a readable storage medium and a computer program product.

Figure 6:
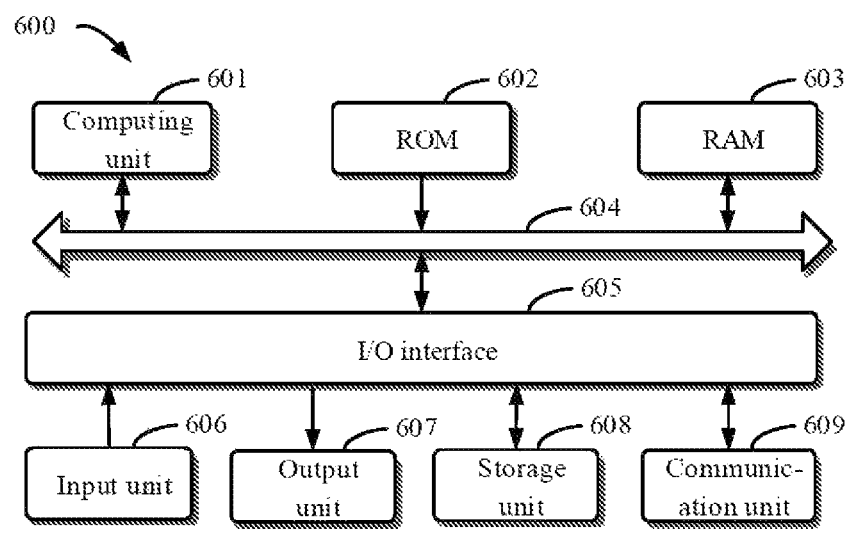
FIG. 6 shows a schematic block diagram of an exemplary electronic device 600 which may be configured to implement the embodiments of the present disclosure.

FIG. 6 shows a schematic block diagram of an exemplary electronic device 600 which may be configured to implement the embodiments of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method according to the present disclosure. For example, in some embodiments, the method according to the present disclosure may be implemented as a computer software program tangibly contained in a machine readable medium, such as the storage unit 608. In some embodiments, part or all of the computer program may be loaded and/or installed into the device 600 via the ROM 602 and/or the communication unit 609. When the computer program is loaded into the RAM 603 and executed by the computing unit 601, one or more steps of the method according to the present disclosure may be performed. Alternatively, in other embodiments, the computing unit 601 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network).

Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A picture searching method, comprising:
    acquiring features of pictures in a picture set to be searched, generating a decision tree according to the features, and configuring corresponding questions for nodes in the decision tree respectively; and
    if a picture searching request of a user is received, asking the user the question, selecting an optimal path from the decision tree in conjunction with an answer of the user, and taking the picture corresponding to a leaf node on the optimal path as a searched picture,
    wherein the selecting an optimal path from the decision tree comprises:
        taking a root node in the decision tree as a current node, and performing the following first processing operation:
        asking the user the question corresponding to the current node;
        acquiring an answer of the user, and determining a child node matched with the answer from child nodes of the current node; and
        if the matched child node is determined to be a leaf node, taking a path from the root node to the leaf node as the optimal path, otherwise, taking the matched child node as the current node, and repeatedly executing the first processing operation.

2. The method according to claim 1, wherein the generating a decision tree according to the features comprises:
    generating the decision tree according to the features on the basis of a predetermined feature selection criterion; the predetermined feature selection criteria comprising an information gain, an information gain ratio, and a Gini coefficient.

3. The method according to claim 2, wherein if the predetermined feature selection criteria comprise the information gain and the information gain ratio, the generating the decision tree comprises:
    taking the root node as the current node, taking a picture set to be searched as a data set corresponding to the current node, taking a feature set formed by the obtained features of the pictures as a feature set corresponding to the current node, and executing the following second processing operation:
    selecting an optimal feature from the feature set corresponding to the current node in conjunction with the information gain and the information gain ratio; establishing corresponding nodes for different feature values corresponding to the optimal features respectively, and taking the established nodes as child nodes of the current node;
    selecting data matched with each child node of the current node from the data set corresponding to the current node to form a data set corresponding to the child node, the matched data being data with the feature value of the optimal feature as the feature value corresponding to the child node;
    deleting the optimal feature from the feature set corresponding to the current node to obtain an updated feature set; and
    if each child node of the current node is determined to be a leaf node, ending the processing operation for the child node, otherwise, taking the child node as the current node, taking the updated feature set as the feature set corresponding to the current node, and repeating the second processing operation until the last nodes on all paths starting from the root node are leaf nodes.

4. The method according to claim 2, wherein if the predetermined feature selection criteria comprise the information gain, the information gain ratio and the Gini coefficient, the generating the decision tree comprises:
    taking the root node as the current node, taking the picture set to be searched as the data set corresponding to the current node, taking the feature set formed by the obtained features of the pictures as the feature set corresponding to the current node, and executing the following third processing operation:
    selecting an optimal feature from the feature set corresponding to the current node in conjunction with the information gain and the information gain ratio; selecting M feature values from the feature values corresponding to the optimal feature using the Gini coefficient, M being a positive integer and less than the number of the feature values corresponding to the optimal feature, and taking the unselected feature values as other feature values; taking the other feature values as a whole, establishing nodes corresponding to the M feature values and the other feature values respectively, and taking the established M+1 nodes as child nodes of the current node;
    selecting data matched with each child node of the current node from the data set corresponding to the current node to form a data set corresponding to the child node, the matched data being data with the feature value of the optimal feature as the feature value corresponding to the child node;
    deleting the optimal feature from the feature set corresponding to the current node to obtain an updated feature set; and if each child node of the current node is determined to be a leaf node, ending the processing operation for the child node, otherwise, taking the child node as the current node, taking the updated feature set as the feature set corresponding to the current node, and repeating the third processing operation until the last nodes on all paths starting from the root node are leaf nodes.

5. The method according to claim 4, wherein the selecting an optimal feature from the feature set corresponding to the current node in conjunction with the information gain and the information gain ratio comprises:
acquiring the information gain of each feature in the feature set corresponding to the current node with respect to the data set corresponding to the current node;
calculating a mean value of the acquired information gains, and selecting the feature with the corresponding information gain greater than the mean value from the features in the feature set corresponding to the current node;
acquiring the information gain ratio of each selected feature with respect to the data set corresponding to the current node; and
taking the feature with the largest information gain ratio as the optimal feature.

6. The method according to claim 4, wherein the selecting M feature values from the feature values corresponding to the optimal feature using the Gini coefficient comprises:
acquiring the Gini coefficient of each feature value corresponding to the optimal feature with respect to the data set corresponding to the current node;
sequencing the acquired Gini coefficients in an ascending order, and selecting the first M Gini coefficients after the sequencing operation; and
taking the feature values corresponding to the selected M Gini coefficients as the M feature values selected from the feature values corresponding to the optimal feature.

7. An electronic device, comprising:
at least one processor; and
a memory communicatively connected with the at least one processor;
wherein the memory stores instructions executable by the at least one processor, and the instructions are executed by the at least one processor to enable the at least one processor to perform a picture searching method, wherein the picture searching method comprises:
acquiring features of pictures in a picture set to be searched, generating a decision tree according to the features, and configuring corresponding questions for nodes in the decision tree respectively; and
if a picture searching request of a user is received, asking the user the question, selecting an optimal path from the decision tree in conjunction with an answer of the user, and taking the picture corresponding to a leaf node on the optimal path as a searched picture,
wherein the selecting an optimal path from the decision tree comprises:
taking a root node in the decision tree as a current node, and performing the following first processing operation:
asking the user the question corresponding to the current node;
acquiring an answer of the user, and determining a child node matched with the answer from child nodes of the current node;
if the matched child node is determined to be a leaf node, taking a path from the root node to the leaf node as the optimal path, otherwise, taking the matched child node as the current node, and repeatedly executing the first processing operation.

8. The electronic device according to claim 7, wherein the generating a decision tree according to the features comprises:
generating the decision tree according to the features on the basis of a predetermined feature selection criterion;
the predetermined feature selection criteria comprising an information gain, an information gain ratio, and a Gini coefficient.

9. The electronic device according to claim 8,
wherein if the predetermined feature selection criteria comprise the information gain and the information gain ratio, the generating the decision tree comprises:
taking the root node as the current node, taking a picture set to be searched as a data set corresponding to the current node, taking a feature set formed by the obtained features of the pictures as a feature set corresponding to the current node, and executing the following second processing operation:
selecting an optimal feature from the feature set corresponding to the current node in conjunction with the information gain and the information gain ratio; establishing corresponding nodes for different feature values corresponding to the optimal features respectively, and taking the established nodes as child nodes of the current node;
selecting data matched with each child node of the current node from the data set corresponding to the current node to form a data set corresponding to the child node, the matched data being data with the feature value of the optimal feature as the feature value corresponding to the child node;
deleting the optimal feature from the feature set corresponding to the current node to obtain an updated feature set; and
if each child node of the current node is determined to be a leaf node, ending the processing operation for the child node, otherwise, taking the child node as the current node, taking the updated feature set as the feature set corresponding to the current node, and repeating the second processing operation until the last nodes on all paths starting from the root node are leaf nodes.

10. The electronic device according to claim 8,
wherein if the predetermined feature selection criteria comprise the information gain, the information gain ratio and the Gini coefficient, the generating the decision tree comprises:
taking the root node as the current node, taking the picture set to be searched as the data set corresponding to the current node, taking the feature set formed by the obtained features of the pictures as the feature set corresponding to the current node, and executing the following third processing operation:
selecting an optimal feature from the feature set corresponding to the current node in conjunction with the information gain and the information gain ratio; selecting M feature values from the feature values corresponding to the optimal feature using the Gini coefficient, M being a positive integer and less than the number of the feature values corresponding to the optimal feature, and taking the unselected feature values as other feature values; taking the other feature

21 values as a whole, establishing nodes corresponding to the M feature values and the other feature values respectively, and taking the established M+1 nodes as child nodes of the current node;

selecting data matched with each child node of the current node from the data set corresponding to the current node to form a data set corresponding to the child node, the matched data being data with the feature value of the optimal feature as the feature value corresponding to the child node;

deleting the optimal feature from the feature set corresponding to the current node to obtain an updated feature set; and if each child node of the current node is determined to be a leaf node, ending the processing operation for the child node, otherwise, taking the child node as the current node, taking the updated feature set as the feature set corresponding to the current node, and repeating the third processing operation until the last nodes on all paths starting from the root node are leaf nodes.

11. The electronic device according to claim 10, wherein the selecting an optimal feature from the feature set corresponding to the current node in conjunction with the information gain and the information gain ratio comprises:

acquiring the information gain of each feature in the feature set corresponding to the current node with respect to the data set corresponding to the current node;

calculating a mean value of the acquired information gains, and selecting the feature with the corresponding information gain greater than the mean value from the features in the feature set corresponding to the current node;

acquiring the information gain ratio of each selected feature with respect to the data set corresponding to the current node, and taking the feature with the largest information gain ratio as the optimal feature.

12. The electronic device according to claim 10, wherein the selecting M feature values from the feature values corresponding to the optimal feature using the Gini coefficient comprises:

acquiring the Gini coefficient of each feature value corresponding to the optimal feature with respect to the data set corresponding to the current node;

sequencing the acquired Gini coefficients in an ascending order, and selecting the first M Gini coefficients after the sequencing operation, and taking the feature values corresponding to the selected M Gini coefficients as the M feature values selected from the feature values corresponding to the optimal feature.

13. A non-transitory computer readable storage medium with computer instructions stored thereon, wherein the computer instructions are used for causing a computer to perform a picture searching method, wherein the picture searching method comprises:

acquiring features of pictures in a picture set to be searched, generating a decision tree according to the features, and configuring corresponding questions for nodes in the decision tree respectively; and if a picture searching request of a user is received, asking the user the question, selecting an optimal path from the decision tree in conjunction with an answer of the user, and taking the picture corresponding to a leaf node on the optimal path as a searched picture,

22 wherein the selecting an optimal path from the decision tree comprises:

taking a root node in the decision tree as a current node, and performing the following first processing operation:

asking the user the question corresponding to the current node;

acquiring an answer of the user, and determining a child node matched with the answer from child nodes of the current node; and if the matched child node is determined to be a leaf node, taking a path from the root node to the leaf node as the optimal path, otherwise, taking the matched child node as the current node, and repeatedly executing the first processing operation.

14. The non-transitory computer readable storage medium according to claim 13, wherein the generating a decision tree according to the features comprises:

generating the decision tree according to the features on the basis of a predetermined feature selection criterion;

the predetermined feature selection criteria comprising an information gain, an information gain ratio, and a Gini coefficient.

15. The non-transitory computer readable storage medium according to claim 14, wherein if the predetermined feature selection criteria comprise the information gain and the information gain ratio, the generating the decision tree comprises:

taking the root node as the current node, taking a picture set to be searched as a data set corresponding to the current node, taking a feature set formed by the obtained features of the pictures as a feature set corresponding to the current node, and executing the following second processing operation:

selecting an optimal feature from the feature set corresponding to the current node in conjunction with the information gain and the information gain ratio; establishing corresponding nodes for different feature values corresponding to the optimal features respectively, and taking the established nodes as child nodes of the current node;

selecting data matched with each child node of the current node from the data set corresponding to the current node to form a data set corresponding to the child node, the matched data being data with the feature value of the optimal feature as the feature value corresponding to the child node;

deleting the optimal feature from the feature set corresponding to the current node to obtain an updated feature set; and if each child node of the current node is determined to be a leaf node, ending the processing operation for the child node, otherwise, taking the child node as the current node, taking the updated feature set as the feature set corresponding to the current node, and repeating the second processing operation until the last nodes on all paths starting from the root node are leaf nodes.

16. The non-transitory computer readable storage medium according to claim 14, wherein if the predetermined feature selection criteria comprise the information gain, the information gain ratio and the Gini coefficient, the generating the decision tree comprises:

taking the root node as the current node, taking the picture set to be searched as the data set corresponding to the current node, taking the feature set formed by the obtained features of the pictures as the feature set corresponding to the current node, and executing the following third processing operation:

selecting an optimal feature from the feature set corresponding to the current node in conjunction with the information gain and the information gain ratio; selecting M feature values from the feature values corresponding to the optimal feature using the Gini coefficient, M being a positive integer and less than the number of the feature values corresponding to the optimal feature, and taking the unselected feature values as other feature values; taking the other feature values as a whole, establishing nodes corresponding to the M feature values and the other feature values respectively, and taking the established M+1 nodes as child nodes of the current node;

selecting data matched with each child node of the current node from the data set corresponding to the current node to form a data set corresponding to the child node, the matched data being data with the feature value of the optimal feature as the feature value corresponding to the child node;

deleting the optimal feature from the feature set corresponding to the current node to obtain an updated feature set; and if each child node of the current node is determined to be a leaf node, ending the processing operation for the child node, otherwise, taking the child node as the current node, taking the updated feature set as the feature set corresponding to the current node, and repeating the third processing operation until the last nodes on all paths starting from the root node are leaf nodes.

17. The non-transitory computer readable storage medium according to claim 16, wherein the selecting an optimal feature from the feature set corresponding to the current node in conjunction with the information gain and the information gain ratio comprises:

acquiring the information gain of each feature in the feature set corresponding to the current node with respect to the data set corresponding to the current node;

calculating a mean value of the acquired information gains, and selecting the feature with the corresponding information gain greater than the mean value from the features in the feature set corresponding to the current node;

acquiring the information gain ratio of each selected feature with respect to the data set corresponding to the current node; and taking the feature with the largest information gain ratio as the optimal feature.

* * * * *